Figure 1:
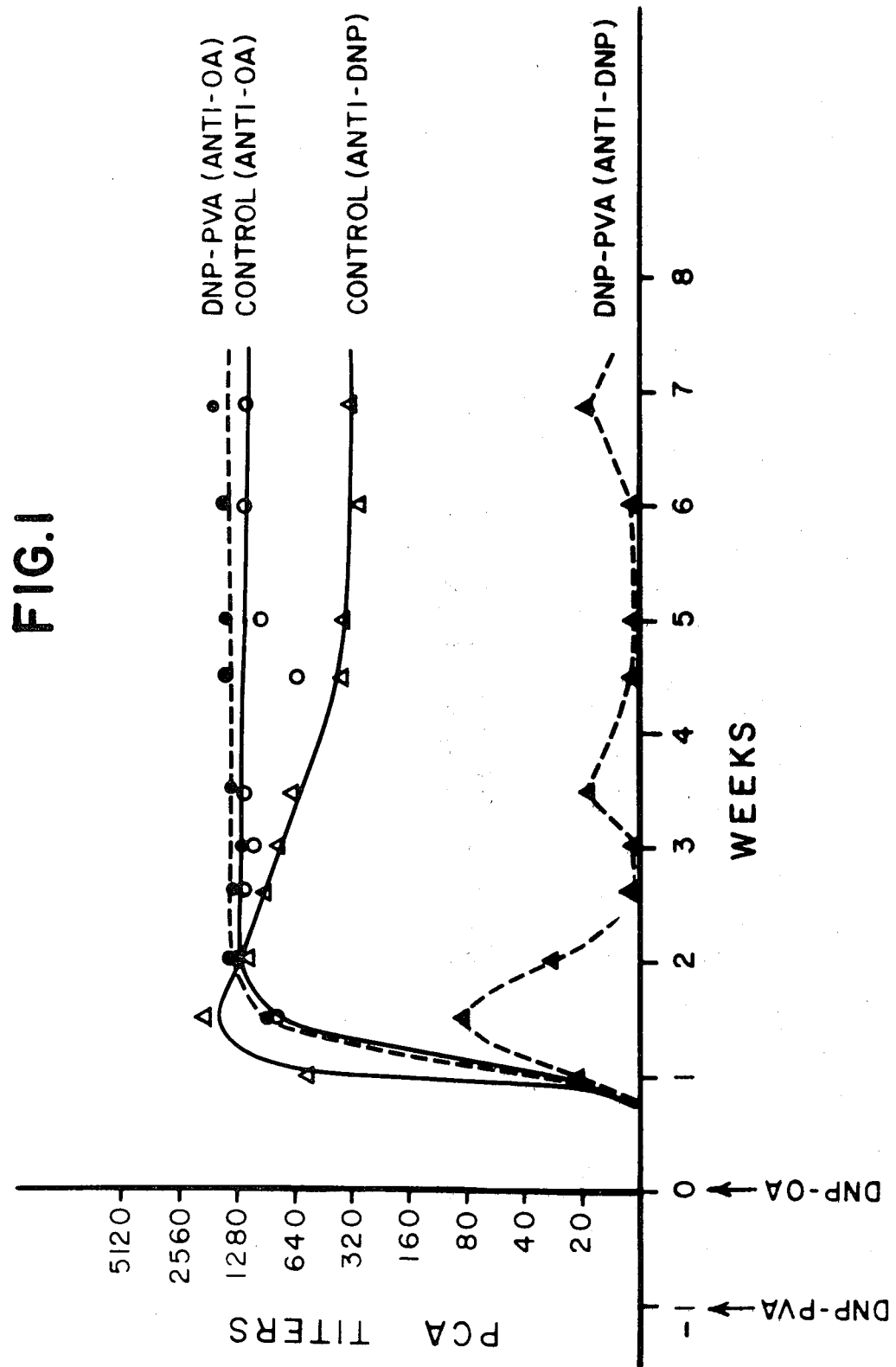
Figure 2:
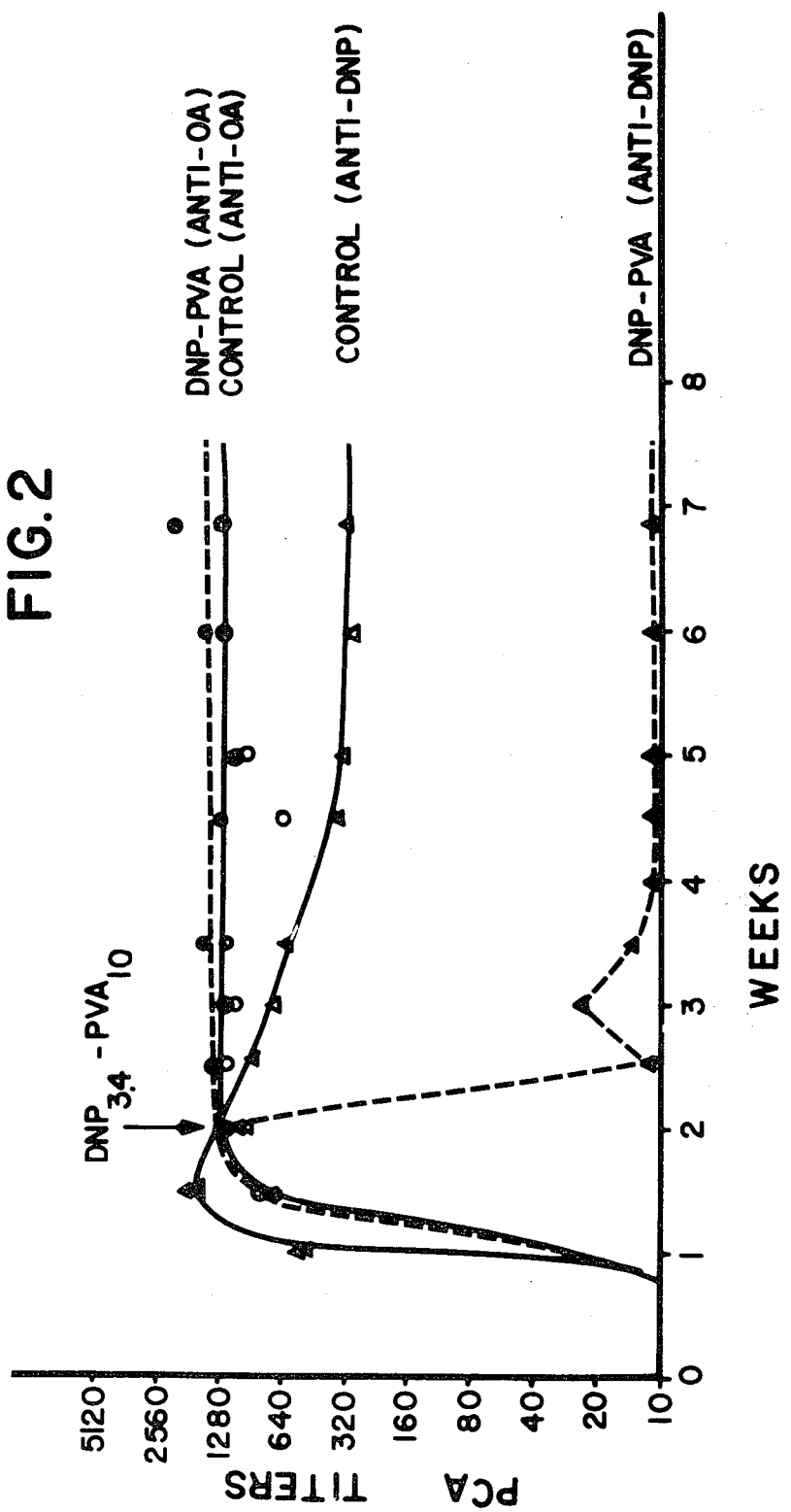

United States Patent [19]

Mischke et al.

[11] 4,430,259
[45] Feb. 7, 1984

[54] WATER-SOLUBLE DISAZO COMPOUNDS SUITABLE AS FIBER-REACTIVE DYESTUFFS

[75] Inventors: Peter Mischke, Bad Soden am Taunus; Hermann Fuchs, Königstein/Taunus; Fritz Meininger, Frankfurt am Main, all of Fed. Rep. of Germany

[73] Assignee: Hoechst Aktiengesellschaft, Frankfurt am Main, Fed. Rep. of Germany

[21] Appl. No.: 318,112

[22] Filed: Nov. 4, 1981

[30] Foreign Application Priority Data

Nov. 6, 1980 [DE] Fed. Rep. of Germany ....... 3041891
Oct. 6, 1981 [DE] Fed. Rep. of Germany ....... 3139657

[51] Int. Cl.³ ................. C09B 62/513; C09B 62/533; D06P 1/38; D06P 3/10
[52] U.S. Cl. ......................... 260/186; 260/174; 260/178; 260/184; 260/185; 260/187; 260/188; 260/189; 260/190; 260/191
[58] Field of Search ............... 260/174, 184, 185, 186, 260/187, 188, 189, 190, 191, 178

[56] References Cited

U.S. PATENT DOCUMENTS

| | | | |
|---|---|---|---|
| 2,657,205 | 10/1953 | Heyna et al. | 260/185 |
| 3,531,459 | 9/1970 | Chiddix et al. | 260/163 |
| 3,951,944 | 4/1976 | Fuchs | 260/186 |
| 4,066,638 | 1/1978 | Fuchs et al. | 260/199 |
| 4,271,072 | 6/1981 | Wenghoefer et al. | 260/207.3 |

FOREIGN PATENT DOCUMENTS

| | | | |
|---|---|---|---|
| 620899 | 7/1963 | Belgium | 260/207.3 |
| 2372210 | 6/1978 | France | 260/207.3 |

*Primary Examiner*—Floyd D. Higel
*Attorney, Agent, or Firm*—Curtis, Morris & Safford

[57] ABSTRACT

Water-soluble disazo compounds, which can be used as fiber reactive dyestuffs and correspond to the general formula

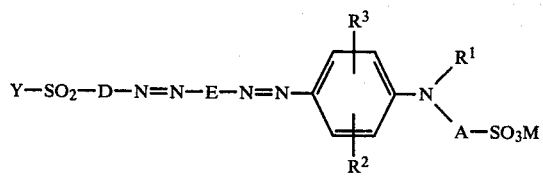

in which
Y is vinyl or —CH$_2$—CH$_2$—Z, Z being sulfato, phosphato, halogen or hydroxy;
d is phenylene or phenylene substituted by 1 or 2 radicals selected from the group consisting of lower alkyl, lower alkoxy, hydroxy, chlorine, bromine, fluorine, carboxy, nitro and sulfo, or
D is naphthylene or naphthylene substituted by 1 or 2 radicals selected from the group consisting of lower alkyl, lower alkoxy, hydroxy, chlorine, bromine, fluorine, carboxy and sulfo;
E is 1,4-phenylene or 1,4-naphthylene, or 1,4-phenylene or 1,4-naphthylene substituted by 1 or 2 radicals selected from the group consisting of lower alkyl, lower alkoxy, hydroxy, ureido, lower alkanoylamino, chlorine, bromine, carboxy and sulfo;
A is ethylene of the formula —CH$_2$—CH$_2$—, or ethyleneoxy of the formula —CH$_2$—CH$_2$—O—, or propylene of the formula —CH$_2$—CH$_2$—CH$_2$—, or is of the formula

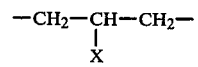

wherein
X is hydroxy, lower alkanoylamino, halogen, sulfato or phosphato, or is

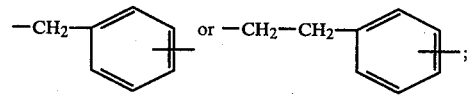

M is hydrogen, a metal or the equivalent of a metal;
R$^1$ is hydrogen, lower alkyl, lower alkenyl or lower alkyl substituted by hydroxy or phenyl or by both, or is alkyl of from 2 to 4 carbon atoms substituted by acetoxy, propionyloxy or phenylsulfonyloxy, or is cyanoalkyl of from 2 to 4 carbon atoms in the alkyl, or is carboxyalkylene, carbonamidoalkylene or carbalkoxyalkylene, the alkyl or aklylene moiety being in each case of from 1 to 4 carbon atoms, or is halogenoethyl or a group of the formula —A—SO$_3$M, A and M being as defined above;
R$^2$ is hydrogen, lower alkyl, lower alkoxy, halogen, lower alkanoylamino, ureido or trifluoromethyl; and
R$^3$ is hydrogen, lower alkyl, lower alkoxy or halogen.

These disazo compounds can be prepared in a manner which is in itself known by reacting the diazo and coupling components which are evident from the formula (1). They serve as dyestuffs for dyeing and printing fibers which contain hydroxyl and/or cabonamide groups, such as cellulose fibers, wool or synthetic polyamide fibers, or leathers.

6 Claims, No Drawings

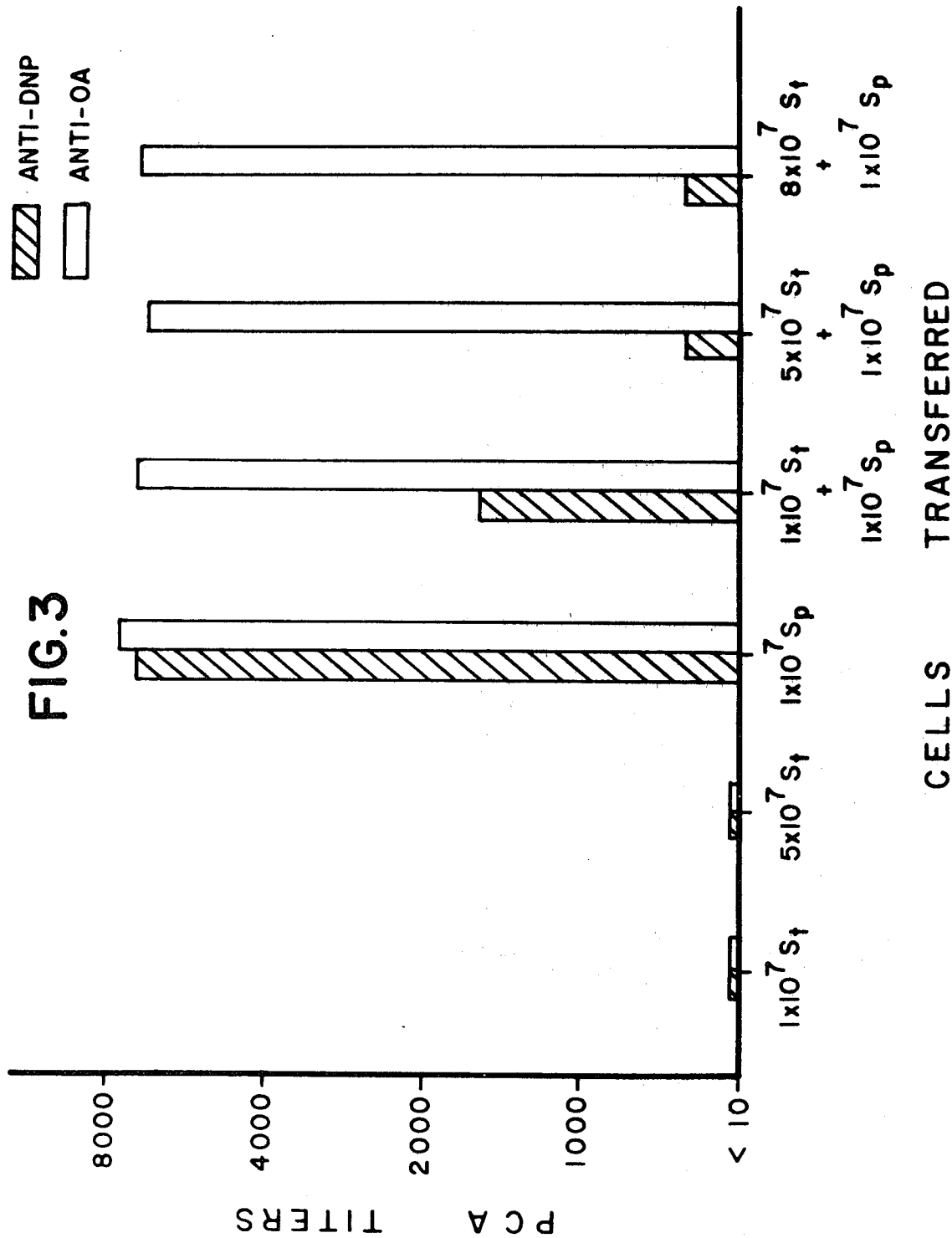

WATER-SOLUBLE DISAZO COMPOUNDS SUITABLE AS FIBER-REACTIVE DYESTUFFS

The present invention is in the industrial field of the water-soluble disazo dyestuffs which have fiber-reactive properties. It relates to new water-soluble disazo compounds of the general formula (1)

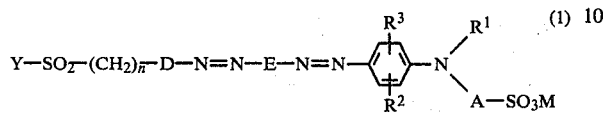

in which Y is the vinyl group or a group of the formula —CH$_2$—CH$_2$—Z, in which Z denotes an organic or inorganic radical which can be eliminated under alkaline conditions, or the hydroxy group, n represents the number zero, 1 or 2, D is a phenylene unsubstituted or substituted by 1 or 2 substituents selected from a group consisting of lower alkyl, lower alkoxy, hydroxy, lower alkanoylamino, benzoylamino, chlorine, bromine, fluorine and carboxy, and/or by one nitro group and/or by one sulfo group, or D is a naphthylene unsubstituted or substituted by 1 or 2 substituents selected from a group consisting of lower alkyl, lower alkoxy, hydroxy, lower alkanoylamino, benzoylamino, chlorine, bromine, fluorine, carboxy and sulfo, and/or by one nitro group, or D is the benzthiazol-2-yl radical which contains the indicated group of the formula Y—SO$_2$—(CH$_2$)$_n$— bonded in the carbocyclic ring and which can be further substituted in this benzene nucleus by a substituent from the group comprising lower alkyl, lower alkoxy, hydroxy, lower alkanoylamino, benzoylamino, nitro, chlorine, bromine and sulfo, E is the 1,4-phenylene radical or the 1,4-naphthylene radical, both of which can be monosubstituted or disubstituted by substituents from the group comprising lower alkyl, lower alkoxy, hydroxy, ureido, lower alkanoylamino, benzoylamino, benzenesulfonylamino, benzoylamino which is substituted by lower alkyl, lower alkoxy, chlorine and/or sulfo, benzenesulfonylamino which is substituted by lower alkyl, lower alkoxy, chlorine and/or sulfo, chlorine, bromine, carboxy and sulfo, A is the ethylene radical of the formula —CH$_2$—CH$_2$— or the ethyleneoxy radical of the formula —CH$_2$—CH$_2$—O— or a propylene radical of the formula —CH$_2$—CH$_2$—CH$_2$—,

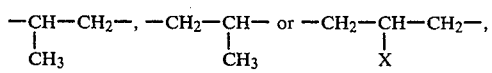

wherein X represents the hydroxy group or an acyloxy group of a lower alkanecarboxylic acid, for example the acetoxy group or propionyloxy group, or a halogen atom, preferably a chlorine atom or bromine atom, or the sulfato group or the phosphato group, or is a radical of the formula

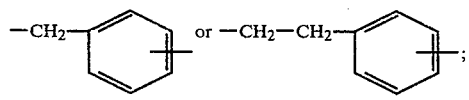

M is a hydrogen atom or the equivalent of a metal, preferably of an alkali metal or of an alkaline earth metal, such as in particular of sodium, potassium or calcium, R$^1$ is a hydrogen atom, a lower alkyl group, a lower alkenyl group or a lower alkyl group which is substituted by phenyl and/or hydroxy, it being possible for the phenyl radical to be substituted by methyl, methoxy and/or chlorine, such as in particular the benzyl group or phenethyl group, and a hydroxyalkyl group having 2 to 4 C atoms, or is an acid-esterified hydroxyalkyl group having 2 to 4 C atoms in this alkyl radical, such as, for example, an acetoxyalkyl, propionyloxyalkyl or phenylsulfonyloxyalkyl, or is a cyanoalkyl group having 2 to 4 C atoms in the alkyl radical, a carboxy-, carbonamido- or carbalkoxyalkylene group having in each case 1 to 4 C atoms in the alkyl or alkylene radical, a halogenoalkyl group having 2 or 3 C atoms, preferably a chloroalkyl group, or a lower halogenoalkenyl group in which the halogen is preferably chlorine or bromine, or is a group of the formula —A—SO$_3$M defined above, R$^2$ is a hydrogen, lower alkyl, of which methyl is preferred, or lower alkoxy unsubstituted or substituted by hydroxy, acetoxy, carboxy, carbonamide, cyano or halogen, such as chlorine and bromine, or is halogen, such as chlorine, bromine or fluorine, lower alkanoylamino, such as acetylamino, or benzoylamino or an ureido or a trifluoromethyl group, and R$^3$ is a hydrogen atom, a lower alkyl group, of which a methyl group is preferred, or a lower alkoxy group, which can be substituted by hydroxy, acetoxy, carboxy, carbonamide, cyano or halogen, such as chlorine or bromine, or is a halogen atom, such as a chlorine atom, bromine atom or fluorine atom.

The formula moieties R$^2$ and R$^3$ can have identical or different meanings.

The terms "lower" denote here, as below, that the alkyl, alkylene or alkenyl radical contained in the group has 1 to 6 or 2 to 6 C atoms, preferably 1 to 4 or 2 to 4 C atoms.

Examples of the groups Z which can be eliminated under alkaline conditions are halogen atoms, such as a chlorine atom, bromine atom or fluorine atom, ester groups of organic carboxylic and sulfonic acids, such as a lower alkanoyloxy radical, for example the acetoxy radical, or an acyloxy radical of an aromatic carboxylic or sulfonic acid, such as the benzoyloxy, sulfobenzoyloxy, benzenesulfonyloxy or toluenesulfonyloxy radical, and also the lower alkylsulfonylamino and arylsulfonylamino groups, the phenoxy group, dialkylamino groups having alkyl groups of 1 to 4 C atoms each, such as the dimethylamino or diethylamino group, and also monoester groups, for example of thiosulfuric acid, of phosphoric acid and in particular of sulfuric acid.

The new disazo compounds can be present in the acid form as well as in the form of their salts. They are preferably in the form of salts, in particular salts of alkali metals and alkaline earth metals, and, amongst these, in particular, as sodium salts, potassium salts and also calcium salts. They can be used, preferably in the form of these salts, as dyestuffs for dyeing and printing fibers which contain hydroxy and/or carbonamide groups, or leathers.

The present invention also relates to a process for the preparation of the abovementioned and defined disazo compounds of the general formula (1). This process comprises diazotizing a compound of the general formula (2)

$$Y-SO_2-(CH_2)_n-D-N=N-E-NH_2 \qquad (2)$$

in which D, E, Y and n have the abovementioned meanings, in a manner which is in itself known and coupling the reaction product with a coupling component of the general formula (3)

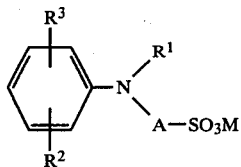

in which M, A, $R^1$, $R^2$ and $R^3$ have the abovementioned meanings, to give a disazo compound of the general formula (1) and, if Y represents the β-hydroxyethyl group, converting this disazo compound having the β-hydroxyethyl group with the aid of a sulfating agent into the corresponding disazo compound of the general formula (1), in which Y represents the β-sulfatoethyl group, or with the aid of a phosphating agent into the corresponding compound of the general formula (1), in which Y represents the β-phosphatoethyl group.

Examples of suitable sulfating agents are 90 to 100% strength sulfuric acid, chlorosulfonic acid, amidosulfonic acid or other compounds which release sulfur trioxide. Examples of suitable phosphating agents are concentrated phosphoric acid, pyrophosphoric acid, metaphosphoric acid or polyphosphoric acid, and also polyphosphoric acid alkyl esters, phosphorus oxychloride or mixtures of phosphoric acid and phosphorus(V) oxide.

Aminoazo compounds of the general formula (2) can be prepared in a way which is in itself known by coupling a diazotized amine of the general formula (4)

$$Y-SO_2-(CH_2)_n-D-NH_2 \quad (4)$$

in which D, Y and n have the abovementioned meanings, with a compound capable of coupling of the general formula (5)

$$H-E-NH_2 \quad (5)$$

in which E has the abovementioned meaning. The further reaction according to the invention (diazotizing and coupling) of this aminoazo compound of the general formula (2) to give a disazo compound of the general formula (1) can be carried out without an intermediate isolating stage after the preparation of the former; for example, this further reaction can be carried out in accordance with the invention in the same reaction batch.

Examples of aromatic amines of the general formula (4), which serve as diazo components in the preparation of the compounds according to the invention, are in particular the following: 4-β-sulfatoethylsulfonylaniline, 4-β-chloroethylsulfonyl-aniline, 4-β-phosphatoethylsulfonyl-aniline, 4-vinylsulfonyl-aniline, 4-β-thiosulfatoethylsulfonyl-aniline, 2-sulfo-4-β-sulfatoethylsulfonyl-aniline, 2-bromo-4-β-sulfatoethylsulfonyl-aniline, 2-chloro-4-β-sulfatoethylsulfonyl-aniline, 2-chloro-5-β-chloroethylsulfonyl-aniline, 3-β-sulfatoethylsulfonyl-aniline, 2-bromo-5-β-sulfatoethylsulfonyl-aniline, 2,6-dichloro-4-β-sulfatoethylsulfonyl-aniline, 2,6-dibromo-4-β-sulfatoethylsulfonyl-aniline, 2,5-dichloro-4-β-sulfatoethylsulfonyl-aniline, 2-methyl-5-β-sulfatoethylsulfonyl-aniline, 2-methoxy-5-β-sulfatoethylsulfonyl-aniline, 2-methoxy-4-β-sulfatoethylsulfonyl-aniline, 2-methyl-6-chloro-4-β-sulfatoethylsulfonyl-aniline, 2,6-dimethyl-4-β-sulfatoethylsulfonyl-aniline, 2,6-dimethyl-3-β-sulfatoethylsulfonyl-aniline, 2,5-dimethoxy-4-β-sulfatoethylsulfonyl-aniline, 2-methoxy-5-methyl-4-β-sulfatoethylsulfonyl-aniline, 2-nitro-4-β-sulfatoethylsulfonyl-aniline, 4-nitro-2-β-sulfatoethylsulfonyl-aniline, 6-β-sulfatoethylsulfonyl-2-naphthyl-amine, 1-sulfo-6-β-sulfatoethylsulfonyl-2-naphthylamine, 8-β-sulfatoethylsulfonyl-2-naphthylamine, 6-sulfo-8-β-sulfatoethylsulfonyl-2-naphthylamine, 6-vinylsulfonyl-2-aminobenzthiazole, 6-β-sulfatoethylsulfonyl-2-aminobenzthiazole, 4-ω-(β-sulfatoethylsulfonyl)-tolylamine, 3-ω-(β-sulfatoethylsulfonyl)-tolylamine, 6-methoxy-3-ω-(β-sulfatoethylsulfonyl)-tolylamine, 4-methoxy-3-ω-(β-sulfatoethylsulfonyl)-tolylamine, 4-ω-(β-sulfatoethylsulfonyl)-ethyl-aniline, 3-ω-(β-sulfatoethylsulfonyl)-ethyl-aniline, 5-(β-sulfatoethylsulfonyl-methyl)-1-naphthylamine and their β-hydroxyethylsulfonyl derivatives.

Compounds of the formula (4) are known and can be prepared by methods which have been extensively described in the literature. For example, the preferred compounds of the formula (4) having a β-sulfatoethylsulfonyl group are obtained from the corresponding β-hydroxyethylsulfonyl compounds by esterification, for example by means of aqueous or concentrated sulfuric acid or by means of amidosulfonic acid, such as, for example, by adding the corresponding β-hydroxethylsulfonyl-anilines and β-hydroxyethylsulfonyl-naphthylamines to an equimolar amount of 60% strength sulfuric acid and subsequent heating in a manner analogous to the process described in German Patent Specification No. 1,150,163, or, for example by dissolving β-hydroxyethylsulfonylanilines or β-hydroxyethylsulfonylnaphthylamines in excess concentrated sulfuric acid or 100% strength sulfuric acid (monohydrate) at room temperature or by reacting them with amidosulfonic acid in the presence of pyridine or a pyridine base in a manner analogous to the esterification process described in German Patent Specification No. 1,443,877. β-Sulfatoethylsulfonyl-anilines and β-sulfatoethylsulfonyl-naphthylamines thus prepared can also be used in the process according to the invention in an unisolated form in the form of the reaction mixture obtained from the esterification.

Aromatic amines of the general formula (5), which serve as coupling components in the preparation of the aminoazo compounds of the general formula (2), are also generally known. Amongst these the following are to be mentioned as preferable: aniline, o-toluidine, m-toluidine, o-anisidine, m-anisidine, anthranilic acid, cresidine, 2,5-xylidine, 2,5-dimethoxy-aniline, 3-aminoacetanilide, 3-amino-acetanilide-4-carboxylic acid, 3-amino-acetanilide-4-sulfonic acid, 3-aminophenylurea, 3-aminophenylurea-4-sulfonic acid, 1-naphthylamine-6-sulfonic acid, 1-naphthylamine-7-sulfonic acid and 2-ethoxy-1-naphthylamine-6-sulfonic acid. The formula member $R^1$ is preferably hydrogen or alkyl of 2 to 4 C-atoms unsubstituted or substituted by phenyl, hydroxy, acetyloxy, propionyloxy, cyano, carbamoyl or chlorine, or is a group of the formula —A—SO$_3$M defined above. When $R^1$ is chloroalkyl, the alkyl group is especially preferred one of 2 or 3 C-atoms. The formula member $R^2$ is preferably hydrogen, methyl, ethyl, methoxy, ethoxy, or methoxy or ethoxy substituted by hydroxy, acetyloxy, carboxy, carbamoyl, cyano or chlorine, or is chlorine or bromine. If $R^2$ is a halogen, chlorine is the preferred one.-The formula member $R^3$ is preferably hydrogen, methyl, ethyl, methoxy, ethoxy, or methoxy or ethoxy substituted by hydroxy, acetyloxy, carboxy, carbamoyl, cyano or chlorine, or is bromine or chlorine. If $R^3$ is a halogen, chlorine is the preferred one.

Those compounds according to the invention of the general formula (1) are preferred for which the formula moiety D denotes the 1,4-phenylene radical or the 1,4-naphthylene radical, both of which can be monosubstituted or disubstituted by substituents from the group comprising methyl, methoxy, hydroxy, chlorine, bromine, carboxy and sulfo.

Those compounds according to the invention of the general formula (1) are also preferred in which E denotes the 1,4-phenylene radical, which can be substituted by 1 or 2 lower alkyl groups, such as in particular methyl or ethyl, or by one or two lower alkoxy groups, such as in particular methoxy and ethoxy, or by one carboxy group or by a lower alkanoylamino group, such as the acetylamino or propionylamino group, or by a ureido group or by a lower alkanoylamino group and a sulfo group or by a ureido group and a sulfo group, or in which E denotes the 1,4-naphthylene radical, which is substituted by a sulfo group or by a lower alkoxy group, such as, for example, the methoxy group and in particular the ethoxy group, and a sulfo group.

The sulfoalkylanilines of the general formula (3) which are used as coupling components in the synthesis of the compounds of the general formula (1) can be prepared by a known method, thus, for example, by the procedures disclosed in German Offenlegungsschriften Nos. 1,481,831 and 1,493,636 and also by the methods described in R. B. Wagner and H. D. Zock, Synthetic Organic Chemistry, John Wiley and Sons, Inc., New York, 1953, pages 812–819, and also by reacting $\alpha,\alpha'$-dichlorohydrin with sodium sulfite in accordance with German Patent Specification No. 258,473 and condensing this reaction product with an aromatic amine, such as, for example, according to the reaction equation

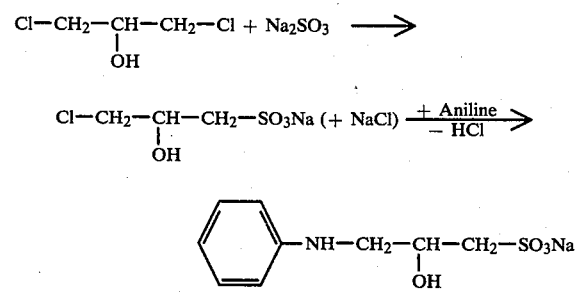

or by reacting propanesultone with aromatic amines.

$\beta$-Sulfoethylaniline derivatives can be prepared by reacting $\beta$-chloroethanesulfonic acid or its salts with aromatic amines, for example by the method described by J. W. James in Journ. prakt. chem. [2]31, 413 (1885). It can also be prepared in a very high degree of purity, for example by the addition of vinylsulfonylfluoride to aniline derivatives and subsequent alkaline hydrolysis of the sulfofluoride group.

The coupling components of the formula (3), which contain a $\beta$-sulfatoethylamino group, can, for example, be prepared by the methods described by K. H. Saunders, J. Chem. Soc. (London) 121, 2667–2675 (1922). They can also be prepared by esterifying their $\beta$-hydroxyethyl-aniline derivatives, for example by reacting them with sulfuric acid, either in 100% strength sulfuric acid in the presence of chlorosulfonic acid or in oleum (i.e. sulfuric acid containing sulfur trioxide). Coupling components of the formula (3) this esterified can also be used in the process according to the invention in an unisolated form, i.e. in the form of the reaction mixture resulting from the esterification.

Examples of compounds of the general formula (3), which serve as coupling components in the preparation of compounds according to the invention are: N-$\beta$-sulfoethylaniline, N-$\beta$-sulfoethyl-2-chloroaniline, N-$\beta$-sulfoethyl-3-chloroaniline, N-$\beta$-sulfoethyl-2-methylaniline, N-$\beta$-sulfoethyl-2-methoxyaniline, N-$\beta$-sulfoethyl-2-methyl-5-chloroaniline, N-$\beta$-sulfoethyl-2-methoxy-5-chloroaniline, N-$\beta$-sulfoethyl-2-chloro-5-methoxyaniline, N-$\beta$-sulfoethyl-2,5-dichloroaniline, N-$\beta$-sulfoethyl-N-methyl-aniline, N-$\beta$-sulfoethyl-N-ethyl-aniline, N-$\beta$-sulfoethyl-N-ethyl-3-methyl-aniline, N-$\beta$-sulfoethyl-N-ethyl-3-chloroaniline, N-$\beta$-sulfoethyl-N-allyl-aniline, N-$\beta$-sulfoethyl-N-benzylaniline, N-$\beta$-sulfoethyl-N-phenethyl-aniline, N-$\beta$-sulfoethyl-N-$\beta$-carbonamidoethyl-aniline, N-$\beta$-sulfoethyl-N-$\beta$-carboxyethyl-aniline, N-$\beta$-sulfoethyl-N-$\beta$-cyanoethyl-aniline, N-$\beta$-sulfoethyl-N-$\beta$-acetoxyethyl-aniline, N-$\beta$-sulfoethyl-N-$\beta$-hydroxyethyl-aniline, N-$\beta$-sulfoethyl-N-ethyl-2-methoxy-5-chloro-aniline, N-$\beta$-sulfoethyl-N-$\beta$-hydroxyethyl-2-methoxy-5-chloro-aniline, N-$\beta$-sulfoethyl-N-$\beta$-hydroxyethyl-3-chloroaniline, N-$\beta$-sulfoethyl-N-$\beta$-carboxyethyl-3-chloroaniline, N,N-bis-($\beta$-sulfoethyl)-aniline, N,N-bis-($\beta$-sulfoethyl)-3-methyl-aniline, N,N-bis-($\beta$-sulfoethyl)-3-chloroaniline, N-$\gamma$-sulfopropyl-aniline, N-$\gamma$-sulfopropyl-3-chloraniline, N-$\gamma$-sulfopropyl-2-methyl-5-chloroaniline, N-($\gamma$-sulfo-$\beta$-hydroxypropyl)-2-methoxy-5-chloroaniline, N-($\gamma$-sulfo-$\beta$-hydroxypropyl)-2-chloroaniline, N-($\gamma$-sulfo-$\beta$-hydroxypropyl)-2,5-dichloroaniline, N-($\gamma$-sulfo-$\beta$-hydroxypropyl)-N-ethylaniline, N-($\gamma$-sulfo-$\beta$-sulfatopropyl)-N-ethyl-3-methylaniline, N-($\gamma$-sulfo-$\beta$-sulfatopropyl)-N-$\beta$-sulfatoethyl-aniline, N-($\gamma$-sulfo-$\beta$-hydroxypropyl)-N-phenethyl-aniline, N-($\gamma$-sulfo-$\beta$-hydroxpropyl)-N-($\beta$-hydroxyethyl)-2-methoxy-5-chloroaniline, N-($\gamma$-sulfo-$\beta$-hydroxypropyl)-aniline, N-($\gamma$-sulfo-$\beta$-hydroxypropyl)-2-chloro-3-methyl-aniline, N-($\gamma$-sulfopropyl)-N-ethyl-3-methylaniline, N-($\gamma$-sulfo-$\beta$-hydroxypropyl)-N-$\beta$-carboxyethyl-3-chloroaniline, N-($\beta$-sulfo-$\alpha$-methyl-ethyl)-aniline, N-($\beta$-sulfo-$\alpha$-methyl-ethyl)-2-methoxy-5-chloroaniline, N,N-bis-($\gamma$-sulfo-$\beta$-hydroxypropyl)-3-chloroaniline, N-($\gamma$-sulfopropyl)-2,5-dichloroaniline, N-$\beta$-sulfatoethyl-aniline, N-$\beta$-sulfatoethyl-N-ethyl-aniline, N-$\beta$-sulfatoethyl-N-methyl-aniline, N-$\beta$-sulfatoethyl-N-n-butyl-aniline, N-$\beta$-sulfatoethyl-N-ethyl-3-methyl-aniline, N-$\beta$-sulfatoethyl-N-ethyl-3-chloro-aniline, N-$\beta$-sulfatoethyl-N-$\beta$-hydroxyethyl-3-chloroaniline, N,N-di-$\beta$-sulfatoethyl-aniline, N,N-di-$\beta$-sulfatoethyl-3-chloro-aniline, N-$\beta$-sulfatoethyl-N-2-bromoallyl-aniline, N-$\beta$-sulfatoethyl-N-2-chloroallyl-aniline, N-$\beta$-sulfatoethyl-N-benzyl-aniline, N-$\beta$-sulfatoethyl-N-$\beta$-carbonamidoethyl-aniline, N-$\beta$-sulfatoethyl-N-$\beta$-carboxyethyl-aniline, N-(4'-sulfophenethyl)-aniline, N-($\beta$-cyanoethyl)-N-(4'-sulfophenethyl)-aniline, N-$\beta$-sulfatoethyl-N-$\beta$-carbethoxyethyl-aniline, N-$\beta$-sulfatoethyl-N-$\beta$-cyanoethyl-aniline, N-$\beta$-sulfatoethyl-N-$\beta$-acetoxyethyl-aniline, N-$\beta$-sulfatoethyl-N-$\beta$-cyanoethyl-3-methyl-aniline and N-$\beta$-sulfatoethyl-N-$\beta$-hydroxyethyl-aniline.

Diazotizing amines of the general formulae (2) or (4) can be effected by generally known methods, for example by reaction with an alkali metal nitrite and an inorganic acid, such as hydrochloric aid, sulfuric acid or phosphoric acid, or by reaction with nitrosylsulfuric acid.

The coupling reaction with the coupling components of the general formulae (3) or (5) can also be carried out in a way which is in itself known in a neutral to acid medium, preferably in a pH range between 1 and 7 and at a temperature between $-5°$ C. and $+25°$ C., if appropriate in the presence of sodium acetate or the like, of buffer substances which influence the coupling rate or of catalysts, such as, for example, dimethylformamide or pyridine.

Compounds of the formula (1), prepared according to the invention, can be separated from the reaction solution by salting out by means of electrolytes, for example sodium chloride or potassium chloride, advantageously after adjusting the pH of the reaction mixture to 3.5 to 7.0; after filtration they are dried. The compounds according to the invention can also be isolated from their synthesis batches by evaporating or spray-drying. In cases, in which relatively large quantities of sulfate ions are present in the reaction solution obtained, it is advisable to precipitate the sulfate ions in the form of sparingly soluble salts, for example as calcium sulfate, prior to the spray-drying. It is also possible to use the solutions of the compound of the formula (1), which are obtained after the synthesis, directly as a liquid formulation as used in dyeing, if appropriate after a buffer substance has been added.

The new compounds of the formula (1) are suitable as dyestuffs, in particular as fiber-reactive dyestuffs; they are preferably applied and fast-fixed, by the application processes known for reactive dyestuffs, to the substrates mentioned below.

The present invention therefore also relates to the use of compounds of the formula (1) as dyestuffs, in particular for dyeing and printing cellulose fibers and natural or synthetic polyamide fibers or leathers, and to a process for dyeing and printing cellulose fiber materials or natural or synthetic polyamide fiber materials or leather, using compounds of the formula (1). Cotton and regenerated cellulose, such as viscose rayon, and also linen, hemp and jute are preferred as the cellulose fiber materials. In particular wool and other animal fibers and also silk, and in particular polyamide 6,6, polyamide 6, polyamide 11 or polyamide 4, of the synthetic polyamides, are suitable polyamide fiber materials.

For example, dyeings having a very good color yield are obtained when the disazo compounds according to the invention are applied to cellulose fibers by the exhaust method, from dyebaths at long liquor ratio and using the most diverse additions of alkali. Likewise, excellent color yields are obtained on cellulose when using the known padding methods, it being possible to fix the compound of the formula (1) by means of alkali by leaving the dyeings to stand at room temperature, by steaming, or by using dry heat. In printing, the customary one-step methods may be used, such as employing an acid-binding agent or alkali-donating agent, such as, for example, sodium bicarbonate sodium carbonate or sodium trichloroacetate, in the printing paste with subsequent fixing by steaming, for example at 100°–103° C., or the two-step methods in neutral or slightly acid printing pastes are used and the printed fiber material is either passed through a hot alkaline bath containing an electrolyte, or overpadded with an alkaline padding liquor containing an electrolyte and thereafter treated with steam or dry heat, for fixation of the compound of the formula (1). These processes produce intense prints having well-delineated contours and a clear white ground. The quality of the prints depends only to a small extent on differing conditions of fixing, and the prints thus have a satisfactory shade reproducibility.

The fastness properties, on cellulose fiber material, of the dyeings or prints which can be obtained with the compounds of the formula (1) are impressive; of these particular mention should be made of the most important manufacturing and end-use fastness properties, such as light-fastness, wash-fastness, for example at 60° C. or 95° C., fastness to acid and alkaline milling, water-fastness, seawater-fastness, fastness to acid cross-dyeing, fastness to alkaline and acid perspiration and also fastness to pleating, ironing and rubbing.

Not only the natural but also the synthetic polyamide fiber materials are dyed with the new compounds of the formula (1), preferably from an acid aqueous dyebath or acid aqueous dye liquor. The desired pH value of the dyebath or the dye liquor is preferably adjusted with acetic acid or acetic acid and ammonium acetate or sodium acetate. In order to achieve an acceptable levelness of the dyeings, or to improve their levelness, it is advantageous also to use, in the dyebath or dye liquor, customary leveling agents, for example compounds based on a product from the reaction of a fatty amine, such as, for example, stearylamine, with an alkylene oxide, such as ethylene oxide, and/or a product from the reaction of cyanuric chloride with an approximately three-fold molar amount of an aminobenzenesulfonic acid and/or an aminonaphthalenesulfonic acid. The dyeings can usually be carried out at a temperature of 60°–105° C., preferably in an exhaust process, in particular at the boiling point of the dyebath, or in a pressure dyeing apparatus at a temperature up to 120° C.

The examples below serve to illustrate the invention. Unless otherwise indicated, the parts mentioned therein are parts by weight and the values in percent represent percentages by weight. Parts by volume relate to parts by weight as the liter relates to the kilogram.

EXAMPLE 1

36.1 parts of 4-β-sulfatoethylsulfonyl-aniline-2-sulfonic acid are dissolved with stirring in 200 parts of warm water by adding sodium bicarbonate; 20 parts by volume of an aqueous 5 N sodium nitrite solution are added and the whole batch is poured onto 200 parts of ice. 35 parts of 31% strength aqueous hydrochloric acid are then allowed to run slowly into the mixture, while stirring; stirring is then continued for another 30 minutes at about 5° C. Excess nitrous acid is destroyed with a little amidosulfonic acid. An acid solution of 10.7 parts of 3-methylaniline in 60 parts of water is added to this diazonium salt solution and the coupling reaction is initially carried out in a strongly acid range, which is later changed to a pH range of 3 to 3.5 by means of the gradual addition of sodium bicarbonate. After coupling is complete, the pH value is adjusted to 6.5 by adding sodium bicarbonate, 20 parts by volume of an aqueous 5 N sodium nitrite solution are then added and the mixture is slowly poured onto a mixture of 300 parts of ice and 35 parts of 31% strength hydrochloric acid. After this diazotizing mixture has been stirred for 2 to 3 hours at about 5° C., excess nitrous acid is destroyed with a little amidosulfonic acid. A solution of 41.9 parts of the disodium salt of N,N-bis-(β-sulfatoethyl)-3-chloroaniline in 150 parts of water is added to the mixture and the coupling reaction is first carried out in a strongly acid range, which is then changed to a pH value of about 4 to 5 by means of the addition of sodium bicarbonate. After the coupling is complete, the pH of the mixture is adjusted to 5.5 to 6 and the prepared disazo compound according to the invention is isolated either by salting out with sodium chloride or by spray-drying.

A dark brown powder is obtained which in addition to electrolyte contains the sodium salt of the compound of the formula follow. The disazo compound according to the invention which is also indicated and corresponds to the general formula (1), is likewise obtained in good yield. These fiber-reactive disazo compounds according to the invention likewise have very good dyestuff properties with very good application properties; they produce dyeings and prints which have good to very good fastness properties and the shade given in the particular example in the table, on the fiber materials mentioned in the descriptive section, in particular on cellulose fiber

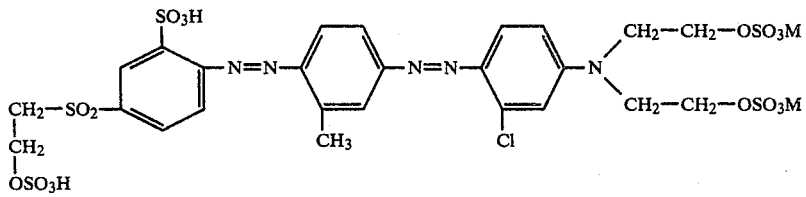

The compound has very good dyestuff properties and produces very intense yellowish brown dyeings and prints having a very good resistance towards washing treatments on the fiber materials mentioned in the descriptive section, such as, for example, cotton and wool, by application and fixing methods customary and known for fiber-reactive dyestuffs.

EXAMPLES 2 TO 13

In order to prepare a disazo compound according to the invention the procedure of Example 1 is followed, but here the disodium salt of N,N-bis-($\beta$-sulfatoethyl)-3-chloroaniline, which serves as a coupling component, is replaced by an equivalent amount of the coupling components, corresponding to the general formula (3), which are indicated in the examples in the tables which materials and wool, by the application and fixing methods customary for fiber-reactive dyestuffs.

The formula moiety M in the compounds which have been indicated by means of a formula, has the above-mentioned meaning; it preferably represents an alkali metal, in particular sodium. The formula radical $D_1$ indicated for the compound according to the invention represents a radical of the formula

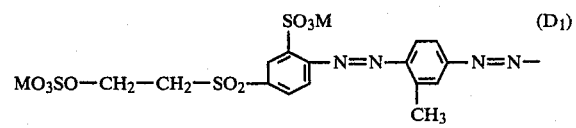

with M having the above-mentioned meaning.

| Example | Coupling component corresponding to the general formula (3) | Disazo compound corresponding to the general formula (1) | Shade on cotton |
|---|---|---|---|
| 2 | 3-Chloro-N—($\beta$-sulfoethyl)-aniline | $D_1$—⟨Cl⟩—NH—CH$_2$—CH$_2$—SO$_3$M | yellowish red |
| 3 | 3-Methyl-N—ethyl-N—($\beta$-sulfoethyl)-aniline | $D_1$—⟨CH$_3$⟩—N(C$_2$H$_5$)(CH$_2$—CH$_2$—SO$_3$M) | violet |
| 4 | 3-Chloro-N,N—bis-($\beta$-sulfoethyl)-aniline | $D_1$—⟨Cl⟩—N(CH$_2$—CH$_2$—SO$_3$M)$_2$ | yellowish brown |
| 5 | N,N—Bis-($\beta$-sulfoethyl)-aniline | $D_1$—⟨⟩—N(CH$_2$—CH$_2$—SO$_3$M)$_2$ | brown |
| 6 | 3-Chloro-6-methoxy-N—ethyl-N—($\beta$-sulfoethyl)-aniline | $D_1$—⟨OCH$_3$, Cl⟩—N(C$_2$H$_5$)(CH$_2$—CH$_2$—SO$_3$M) | bluish-tinged bluish red |

| Example | Coupling component corresponding to the general formula (3) | Disazo compound corresponding to the general formula (1) | Shade on cotton |
|---|---|---|---|
| 7 | 3-Methyl-N—ethyl-N—(β-sulfato-γ-sulfo-n-propyl)-aniline | $D_1$—C$_6$H$_3$(CH$_3$)—N(C$_2$H$_5$)(CH$_2$—CH(OSO$_3$M)—CH$_2$—SO$_3$M) | bluish-tinged bluish red |
| 8 | N—Ethyl-N—(3'-sulfo-benzyl)-aniline | $D_1$—C$_6$H$_4$—N(C$_2$H$_5$)(CH$_2$—C$_6$H$_4$—SO$_3$M) | bluish-tinged bluish red |
| 9 | 3-Chloro-6-methyl-N—(β-sulfoethyl)-aniline | $D_1$—C$_6$H$_2$(CH$_3$)(Cl)—NH—CH$_2$—CH$_2$—SO$_3$M | brown |
| 10 | 3-Methyl-N,N—bis-(β-sulfatoethyl)-aniline | $D_1$—C$_6$H$_3$(CH$_3$)—N(CH$_2$—CH$_2$—OSO$_3$M)$_2$ | violet |
| 11 | N—(β-Cyanoethyl)-N—(β-sulfatoethyl)-aniline | $D_1$—C$_6$H$_4$—N(CH$_2$CH$_2$—CN)(CH$_2$—CH$_2$—OSO$_3$M) | reddish brown |
| 12 | N—(β-Sulfoethyl)-aniline | $D_1$—C$_6$H$_4$—NH—CH$_2$—CH$_2$—SO$_3$M | yellowish brown |
| 13 | N—(β-Hydroxy-γ-sulfo-n-propyl)-aniline | $D_1$—C$_6$H$_4$—NH—CH$_2$—CH(OH)—CH$_2$—SO$_3$M | yellowish brown |

EXAMPLE 14

36.1 parts of 4-β-sulfatoethylsulfonyl-aniline-2-sulfonic acid are diazotized according to the instructions of Example 1. A neutralized solution of 22.3 parts of 1-naphthylamine-6-sulfonic acid in 150 parts of water is added to this diazonium salt solution and the coupling reaction is completed by the gradual addition of sodium bicarbonate at a pH value of 4. The pH value is then adjusted to 6.5, 20 parts by volume of an aqueous 5 N sodium nitrite solution are added and the resulting solution is slowly poured onto a mixture of 400 parts of ice and 35 parts of 31% strength hydrochloric acid. Stirring is continued for about 2 hours at approx. 5° C., and excess nitrous acid is then destroyed with a little amidosulfonic acid. A cooled solution of 25.7 parts of the sodium salt of N-(β-sulfoethyl)-3-chloroaniline in 180 parts of water is then added and the pH is maintained between 4 and 5 by sprinkling sodium acetate onto the mixture. The resulting disazo compound is isolated from the coupling batch either by salting out with sodium chloride or by spray-drying. A dark brown powder is obtained which in addition to electrolyte contains the sodium salt of the compound of the formula

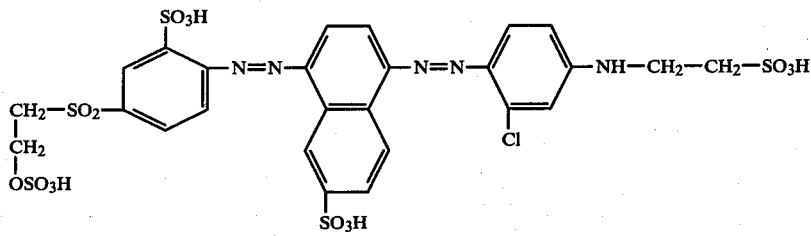

This compound is very highly suitable as a dyestuff and produces very intense brown dyeings and prints, which have good fastness properties, on cotton and wool, by the application and fixing methods customary for fiber-reactive dyestuffs.

EXAMPLES 15 TO 30

To prepare a disazo compound according to the invention, the procedure of Example 14 is followed, but here the sodium salt of N-(β-sulfoethyl)-3-chloroaniline, which serves as coupling component, is replaced by an equivalent amount of one of the coupling components which are indicated in the examples in the following tables and which correspond to the general formula (3). The disazo compound according to the invention which is also indicated and corresponds to the general formula (1) is also obtained in good yield. These fiber-reactive disazo compounds according to the invention also have very good dyestuff properties with very good application properties; they produce on the fiber materials mentioned in the descriptive section, in particular on cellulose fiber materials and wool, by the application and fixing methods customary for fiber-reactive dyestuffs, dyeings and prints having good to very good fastness properties and the shade indicated in the particular example in the table. The formula moiety M present in the compounds indicated by means of the formula has the abovementioned meaning. It preferably represents an alkali metal, in particular sodium. The formula radical $D_2$ indicated for the compound according to the invention represents the radical of the formula

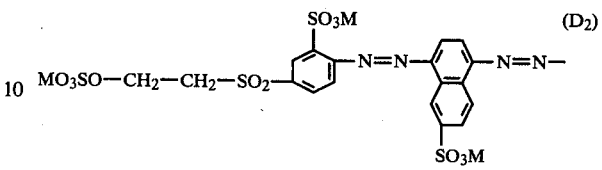

with M having the above-mentioned meaning.

| Example | Coupling component corresponding to the general formula (3) | Disazo compound corresponding to the general formula (1) | Shade on cotton |
|---|---|---|---|
| 15 | 3-Methyl-N—ethyl-N—(β-sulfoethyl)-aniline | 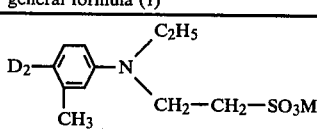 | bluish violet |
| 16 | 3-Chloro-N,N—bis-(β-sulfatoethyl)-aniline | 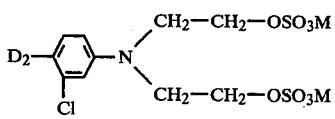 | opaque violet |
| 17 | 3-Chloro-6-methyl-N—(β-sulfoethyl)-aniline | 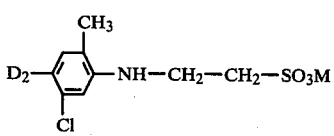 | opaque bluish red |
| 18 | N—(β-Cyanoethyl)-N—(β-sulfatoethyl)-aniline | 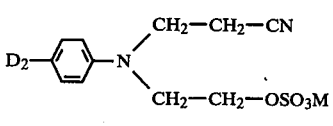 | bluish red |
| 19 | 3-Methyl-N—ethyl-N—(β-sulfato-γ-sulfo-n-propyl)-aniline | 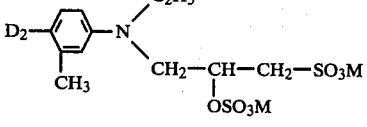 | bluish violet |
| 20 | N—(β-Sulfato-ethyl)-N—(β-sulfato-γ-sulfo-n-propyl)-aniline | 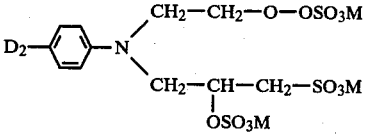 | violet-tinged brown |
| 21 | 2,5-Dichloro-N—(β-sulfoethyl)-aniline | 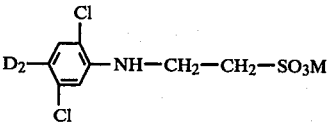 | brownish bluish red |
| 22 | 3-Methyl-N,N—(β-sulfatoethyl)-aniline | 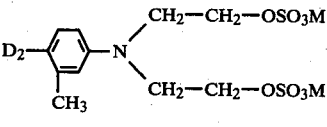 | bluish violet |
| 23 | N,N—Bis-(β-sulfoethyl)-aniline | 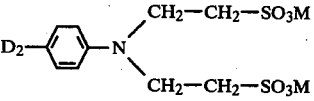 | bluish red |

| Example | Coupling component corresponding to the general formula (3) | Disazo compound corresponding to the general formula (1) | Shade on cotton |
|---|---|---|---|
| 24 | N—(β-Sulfoethyl)-aniline | D₂—⟨⟩—NH—CH₂—CH₂—SO₃M | reddish brown |
| 25 | N—(β-Hydroxyethyl)-N—(β-sulfoethyl)-aniline | D₂—⟨⟩—N(CH₂—CH₂OH)(CH₂—CH₂—SO₃M) | bluish red |
| 26 | 2-Chloro-N—(β-sulfoethyl)-aniline | D₂—⟨⟩(Cl)—NH—CH₂—CH₂—SO₃M | reddish brown |
| 27 | N—Methyl-N—(β-hydroxy-γ-sulfo-n-propyl)-aniline | D₂—⟨⟩—N(CH₃)(CH₂—CH(OH)—CH₂—SO₃M) | bluish red |
| 28 | 3-Chloro-N—(γ-sulfo-n-propyl)-aniline | D₂—⟨⟩(Cl)—NH—CH₂—CH₂—CH₂—SO₃M | brown |
| 29 | 2-Methoxy-N—(β-sulfoethyl)-aniline | D₂—⟨⟩(OCH₃)—NH—CH₂—CH₂—SO₃M | violet |
| 30 | 2,3-Dichlor-N—(β-sulfoethyl)-aniline | D₂—⟨⟩(Cl)(Cl)—NH—CH₂—CH₂—SO₃M | reddish brown |

EXAMPLE 31

59.4 parts of the aminoazo compound of the formula

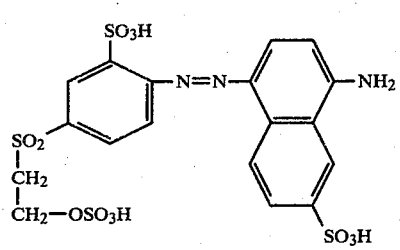

are diazotized according to the instructions of Example 14 and thereafter coupled with a cooled aqueous solution of 26.5 parts of N-(β-sulfoethyl)-N-ethyl-3-methyl-aniline to give a disazo compound. After a customary working-up by means of spray-drying or salting-out, an alkali metal salt of the compound of the formula

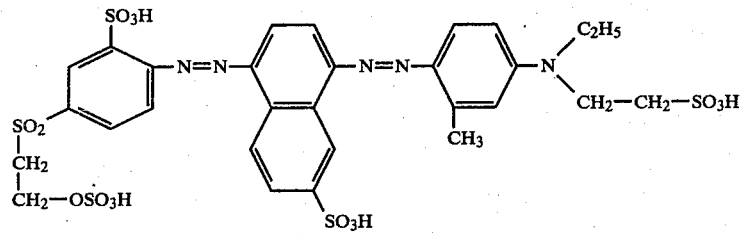

which have very good dyestuff properties, is obtained. The dyestuff salt produces very intense bluish violet dyeings and prints, which have good fastness properties, on cotton and wool, by the application methods customary for fiber-reactive dyestuffs.

EXAMPLE 32

49.3 parts of 4-(β-sulfatoethylsulfonyl)-3',6'-dimethyl-4'-aminoazobenzene-2-sulfonic acid are adjusted in 300 parts of water to a pH value of 6 by means of sodium bicarbonate, and 20 parts by volume of aqueous 5 N sodium nitrite solution is added to the solution. This mixture is slowly added to a mixture of 200 parts of ice and 35 parts of 31% strength aqueous hydrochloric acid; the resulting diazotizing reaction is completed by stirring for 3 hours at a temperature of 5°–10° C. Excess nitrous acid is destroyed with a little amidosulfonic acid. For the coupling reaction, a cooled aqueous solution of 25.1 parts of the sodium salt of N-ethyl-N-(β-sulfoethyl)-aniline is then added and the pH value is adjusted to 5.5 to 6 by sprinkling in sodium bicarbonate. After the coupling is complete, the sodium salt of the compound of the formula

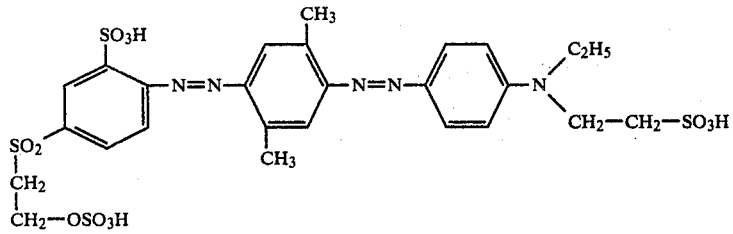

is isolated in a customary manner by spray-drying. The compound has very good dyestuff properties and produces dyeings and prints in the shades of bluish-tinged bluish red, which have good fastness properties, on cotton and wool, by the application and fixing methods customary for fiber-reactive dyestuffs.

EXAMPLES 33 TO 49

More disazo compounds according to the invention are listed in the form of the free acid in the examples in the following tables. They can be prepared in a method according to the invention from their diazo and coupling components which are evident from the formulae, for example analogously to one of the exemplary embodiments indicated above. They are isolated from the reaction batches preferably in the form of their sodium salts. They likewise are very good dyestuffs which have fiber-reactive properties and they have very good technological properties; they produce, on the fiber materials mentioned in the descriptive section, in particular on cellulose fiber materials and wool, by the application and fixing methods customary for fiber-reactive dyestuffs, dyeings and prints having good to very good fastness properties and the shades indicated.

| Example | Disazo compound of the formula (1) | Shade on cotton |
|---|---|---|
| 33 | | violet |
| 34 | | violet |
| 35 | | reddish blue |
| 36 | | violet-tinged brown |

-continued

| Example | Disazo compound of the formula (1) | Shade on cotton |
|---|---|---|
| 37 | (structure: 2-SO3H, 5-SO2CH2CH2-OSO3H phenyl —N=N— 2,5-dimethylphenyl —N=N— 3-methyl-N-ethyl-N-(3-sulfobenzyl)aniline) | reddish brown |
| 38 | (structure: 4-(SO2CH2CH2OSO3H)phenyl —N=N— 2-OCH3-5-CH3-phenyl —N=N— 3-chloro-N,N-bis(2-sulfatoethyl)aniline) | brown |
| 39 | (structure: 2,4-di-OCH3-5-(SO2CH2CH2OSO3H)phenyl —N=N— 6-sulfonaphthyl —N=N— 3-chloro-N,N-bis(2-sulfatoethyl)aniline) | bluish violet |
| 40 | (structure: 2-OCH3-4-(SO2CH2CH2OSO3H)-5-CH3-phenyl —N=N— 6-sulfonaphthyl —N=N— 3-methyl-N,N-bis(2-sulfatoethyl)aniline) | violet-tinged brown |
| 41 | (structure: 6-(SO2CH2CH2OSO3H)naphthyl —N=N— 6-sulfonaphthyl —N=N— 3-chloro-N,N-bis(2-sulfatoethyl)aniline) | brown |
| 42 | (structure: 2-OCH3-5-(SO2CH2CH2OSO3H)phenyl —N=N— sulfonaphthyl —N=N— 3-methyl-N,N-bis(2-sulfatoethyl)aniline) | bluish violet |
| 43 | (structure: 2-OCH3-5-(SO2CH2CH2OSO3H)phenyl —N=N— 2-(NHCONH2)phenyl —N=N— 3-chloro-N,N-bis(2-sulfatoethyl)aniline) | yellowish red brown |
| 44 | (structure: 4-(SO2CH2CH2OSO3H)phenyl —N=N— 2-SO3H-5-NHCOCH3-phenyl —N=N— 3-methyl-N-ethyl-N-(2-sulfo-3-sulfatopropyl)aniline) | bluish-tinged bluish red |

-continued

| Example | Disazo compound of the formula (1) | Shade on cotton |
|---|---|---|
| 45 | (structure with COOH, CH₃, OCH₃, Cl, SO₂-CH₂-CH₂-OSO₃H, N(CH₂-CH₂-OSO₃H)₂) | violet-tinged brown |
| 46 | (structure with Br, naphthalene-SO₃H, SO₂-CH₂-CH₂-OSO₃H, N(CH₂-CH₂-OSO₃H)(CH₂-CH(OSO₃H)-CH₂-SO₃H)) | brownish violet |
| 47 | (structure with Cl, Cl, CH₃, CH₃, CH₃, SO₂-CH₂-CH₂-OSO₃H, NH-CH₂-CH(OSO₃H)-CH₂-SO₃H) | brown |
| 48 | (structure with SO₂-CH₂-CH₂-OSO₃H, SO₃H, Cl, NH-CH₂-CH₂-SO₃H) | bluish red |
| 49 | (structure with COOH, SO₂-CH₂-CH₂-OSO₃H, CH₃, N(CH₂-CH₂-SO₃H)₂) | bluish red |

EXAMPLES 50 TO 57

To prepare a disazo compound according to the invention the procedure of Example 31 is followed, but here N-(β-sulfoethyl)-N-ethyl-3-methyl-aniline, which serves as a coupling component, is replaced by an equivalent amount of one of the coupling components indicated in the examples in the tables below and which correspond to the general formula (3). The disazo compound according to the invention, also indicated and corresponding to the general formula (1), is obtained in likewise good yield. These fiber-reactive disazo compounds according to the invention also have very good dyestuff properties with very good application properties; they produce, on the fiber materials mentioned in the descriptive section, in particular on cellulose fiber materials and cotton, by the application and fixing methods customary for fiber reactive dyestuffs, dyeings and prints which have good to very good fastness properties and the shade indicated in the particular example in the table. The formula moiety M present in the compound indicated by means of the formula has the abovementioned meaning; it preferably represents an alkali metal, in particular sodium. The formula radical $D_3$ indicated for the compound according to the invention represents a radical of the formula

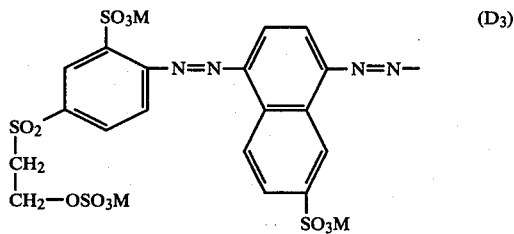

(D₃)

with M having the abovementioned meaning.

| Example | Coupling component corresponding to the general formula (3) | Disazo compound corresponding to the general formula (1) | Shade |
|---|---|---|---|
| 50 | N—(4'-Sulfophenethyl)-aniline | 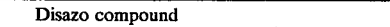 | reddish brown |

| Example | Coupling component corresponding to the general formula (3) | Disazo compound corresponding to the general formula (1) | Shade |
|---|---|---|---|
| 51 | N—(β-Cyanoethyl)-N—(4'-sulfophenethyl)-aniline | D$_3$—C$_6$H$_4$—N(CH$_2$—CH$_2$—CN)(CH$_2$—CH$_2$—C$_6$H$_4$—SO$_3$M) | reddish brown |
| 52 | N—(β-Cyanoethyl)-N—(β-sulfatoethyl)-aniline | D$_3$—C$_6$H$_4$—N(CH$_2$—CH$_2$—CN)(CH$_2$—CH$_2$—OSO$_3$M) | reddish brown |
| 53 | 3-Chloro-N,N—bis-(β-sulfatoethyl)-aniline | D$_3$—C$_6$H$_3$(Cl)—N(CH$_2$—CH$_2$—OSO$_3$M)$_2$ | violet-tinged brown |
| 54 | 2,5-Dichloro-N—(β-sulfoethyl)-aniline | D$_3$—C$_6$H$_3$(Cl)$_2$—NH—CH$_2$—CH$_2$—SO$_3$M | brown |
| 55 | 3-Methyl-N—ethyl-N—(β-sulfato-γ-sulfo-n-propyl)-aniline | D$_3$—C$_6$H$_3$(CH$_3$)—N(C$_2$H$_5$)(CH$_2$—CH(OSO$_3$M)—CH$_2$—SO$_3$M) | bluish-tinged bluish red |
| 56 | 3-Methyl-N—ethyl-(3'-sulfobenzyl)-aniline | D$_3$—C$_6$H$_3$(CH$_3$)—N(C$_2$H$_5$)(CH$_2$—C$_6$H$_4$—SO$_3$M) | bluish-tinged bluish red |
| 57 | 3-Chlor-N—(β-carboxyethyl)-N—(β-sulfoethyl)-aniline | D$_3$—C$_6$H$_3$(Cl)—N(CH$_2$—CH$_2$—COOM)(CH$_2$—CH$_2$—SO$_3$M) | reddish brown |

EXAMPLES 58 TO 71

Further disazo compounds according to the invention are listed in the form of the free acid in the examples in the following tables. They can be prepared by a method according to the invention from their diazo and coupling components which are evident from the formulae, for example analogously to one of the exemplary embodiments mentioned above. They are isolated from the reaction batches preferably in the form of their sodium salts. They are also very good dyestuffs which have fiber-reactive properties and have very good application properties; they produce, on the fiber materials mentioned in the descriptive section, in particular on cellulose fiber materials and wool, by the application and fixing methods customary for fiber-reactive dyestuffs, dyeings and prints which have good to very good fastness properties and the shades indicated.

| Example | Disazo compound of the formula (1) | Shade on cotton |
|---|---|---|
| 58 | (HO$_3$SO—CH$_2$—CH$_2$—SO$_2$)—C$_6$H$_4$—N=N—(naphthalene-SO$_3$H)—N=N—C$_6$H$_4$—N(CH$_2$—CH$_2$—SO$_3$H)$_2$ | brownish-tinged bluish red |

-continued

| Example | Disazo compound of the formula (1) | Shade on cotton |
|---|---|---|
| 59 | Naphthalene-SO₂-CH₂-CH₂-OSO₃H with SO₃H, -N=N-, NH-CO-CH₃, -N=N-, phenyl-N(CH₂-CH₂-COOH)(CH₂-CH₂-OSO₃H) | bluish-tinged bluish red |
| 60 | Phenyl-SO₂-CH₂-CH₂-OSO₃H, -N=N-, naphthalene with SO₃H, -N=N-, (3-methylphenyl)-N(CH₂-CH₂-OSO₃H)₂ | brownish violet |
| 61 | (2-OCH₃, 4-SO₂CH₂CH₂OSO₃H)phenyl, -N=N-, naphthalene with SO₃H, -N=N-, phenyl-N(CH₂-CH₂-COOH)(CH₂-CH₂-C₆H₄-SO₃H) | violet |
| 62 | Phenyl-SO₂-CH₂-CH₂-OSO₃H, -N=N-, (NHCONH₂)phenyl, -N=N-, phenyl-N(CH₂-CH₂-OSO₃H)₂ | red brown |
| 63 | Phenyl-SO₂-CH₂-CH₂-OPO₃H₂, -N=N-, (SO₃H, NHCOCH₃)phenyl, -N=N-, (OCH₃)phenyl-NH-CH₂-CH(OSO₃H)-CH₂-SO₃H | brown violet |
| 64 | (SO₃H, SO₂CH₂CH₂OSO₃H)phenyl, -N=N-, (OCH₃)phenyl, -N=N-, (OCH₃)phenyl-NH-CH₂-CH₂-SO₃H | dark brown |
| 65 | (SO₃H, HO₃S, SO₂-CH=CH₂)phenyl, -N=N-, (CH₃, OCH₃)phenyl, -N=N-, (Cl)phenyl-NH-CH₂-CH₂-SO₃H | bluish brown |
| 66 | Phenyl-SO₂-CH₂-CH₂-OSO₃H, -N=N-, (COOH)phenyl, -N=N-, (OCH₃, Cl)phenyl-N(CH₂-CH₂-OH)(CH₂-CH₂-SO₃H) | violet |
| 67 | (SO₃H, HO₃S, SO₂-CH=CH₂)phenyl, -N=N-, (CH₃)phenyl, -N=N-, (CH₃)phenyl-N(CH₂-CH₂-OSO₃H)₂ | bluish-tinged bluish red |

| Example | Disazo compound of the formula (1) | Shade on cotton |
|---|---|---|
| 68 | 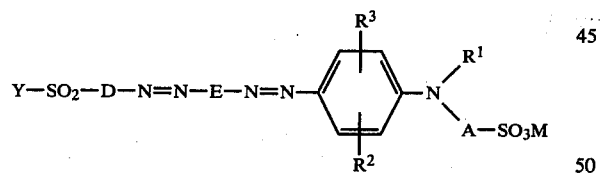 | bluish-tinged bluish red |
| 69 | | violet-tinged brown |
| 70 | | violet-tinged brown |
| 71 | | brown |
| 72 | | brownish violet |

We claim:
1. A water-soluble disazo compound of the formula

$$Y-SO_2-D-N=N-E-N=N-\underset{R^2}{\overset{R^3}{\text{Ar}}}-N\underset{A-SO_3M}{\overset{R^1}{<}}$$

in which
Y is vinyl or —CH$_2$—CH$_2$—Z, Z being sulfato, phosphato, halogen or hydroxy;
D is phenylene or phenylene substituted by 1 or 2 radicals selected from the group consisting of lower alkyl, lower alkoxy, hydroxy, chlorine, bromine, fluorine, carboxy, nitro and sulfo, or
D is naphthylene or naphthylene substituted by 1 or 2 radicals selected from the group consisting of lower alkyl, lower alkoxy, hydroxy, chlorine, bromine, fluorine, carboxy and sulfo;
E is 1,4-phenylene or 1,4-naphthylene, or 1,4-phenylene or 1,4-naphthylene substituted by 1 or 2 radicals selected from the group consisting of lower alkyl, lower alkoxy, hydroxy, ureido, lower alkanoylamino, chlorine, bromine, carboxy and sulfo;

A is ethylene of the formula —CH$_2$—CH$_2$—, or ethyleneoxy of the formula —CH$_2$—CH$_2$—O—, or propylene of the formula —CH$_2$—CH$_2$—CH$_2$—, or is of the formula $$-CH_2-\underset{X}{CH}-CH_2-$$

wherein
X is hydroxy, lower alkanoylamino, halogen, sulfato or phosphato, or is

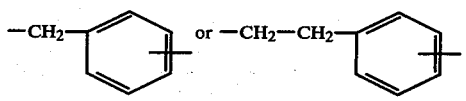

M is hydrogen, a metal or the equivalent of a metal;
R$^1$ is hydrogen, lower alkyl, lower alkenyl or lower alkyl substituted by hydroxy or phenyl or by both, or in alkyl of from 2 to 4 carbon atoms substituted by acetoxy, propionyloxy or phenylsulfonyloxy, or is cyanoalkyl of from 2 to 4 carbon atoms in the alkyl, or is carboxyalkylene, carbonamidoalkylene or carbalkoxyalkylene, the alkyl or aklylene moiety being in each case of from 1 to 4 carbon atoms or is halogenoethyl or a group of the formula —A—SO₃M, A and M being as defined above;

R² is hydrogen, lower alkyl, lower alkoxy, halogen, lower alkanoylamino, ureido or trifluoromethyl; and R³ is hydrogen, lower alkyl, lower alkoxy or halogen.

2. A compound as defined in claim 1 wherein Y is vinyl or β-sulfatoethyl, M is hydrogen or an alkali metal, D is phenylene or phenylene substituted by one sulfo, E is 1,4-phenylene or 1,4-phenylene substituted by 1 or 2 lower alkyl radicals, A is —CH₂—CH₂— or —CH₂—CH₂—O—, R¹ is alkyl of from 2 to 4 carbon atoms or a group of the formula —A—SO₃M, A and M being as defined above, R² is hydrogen, methyl or chlorine and R³ is hydrogen.

3. A compound as defined in claim 1 wherein E is 1,4-phenylene or 1,4-phenylene substituted by one or two radicals selected from the group consisting of lower alkyl and lower alkoxy, or by one carboxy or by one lower alkanoylamino and one sulfo, or by one ureido and one sulfo, or E is 1,4-naphthylene substituted by one sulfo or by one lower alkoxy and one sulfo.

4. A compound as defined in claim 1 or 3, wherein D is 1,4-phenylene or 1,4-naphthylene, or 1,4-phenylene or 1,4-naphthylene substituted by one or two radicals selected from the group consisting of methyl, methoxy, hydroxy, chlorine, bromine, carboxy and sulfo.

5. A compound of the formula

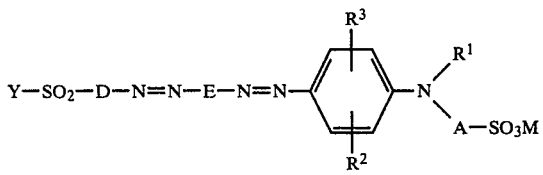

in which

Y is vinyl or —CH₂—CH₂—Z, Z being sulfato, phosphato, thiosulfato, chlorine or hydroxy;

D is phenylene or phenylene substituted by 1 or 2 radicals selected from the group consisting of methyl, methoxy, hydroxy, chlorine, bromine, carboxy and sulfo, or D is naphthylene or naphthylene substituted by sulfo;

E is 1,4-phenylene or 1,4-phenylene substituted by 1 or 2 radicals selected from the group consisting of lower alkyl and lower alkoxy or by 1 carboxy or by 1 lower alkanoylamino or by 1 ureido, or by 1 lower aklanoylamino and 1 sulfo, or by 1 ureido and 1 sulfo, or E is 1,4-naphthylene or 1,4-naphthylene substituted by 1 sulfo or by 1 sulfo and 1 lower alkoxy;

A is —CH₂—CH₂— or —CH₂—CH₂—O— or —CH₂—CH₂—CH₂— or $$-CH_2-CH-CH_2-,$$
$$\phantom{-CH_2-C}|$$
$$\phantom{-CH_2-CH-C}X$$

wherein

X is hydroxy, sulfato or phosphato;

M is hydrogen or an alkali metal;

R¹ is hydrogen or alkyl of from 2 to 4 carbon atoms or said alkyl substituted by hydroxy or phenyl, or is a group of the formula —A—SO₃—M, A and M being as defined above;

R² is hydrogen, methyl, ethyl, methoxy, ethoxy, chlorine or bromine;

R³ is hydrogen, methyl, ethyl, methoxy, ethoxy, bromine or chlorine.

6. A dyestuff of the formula

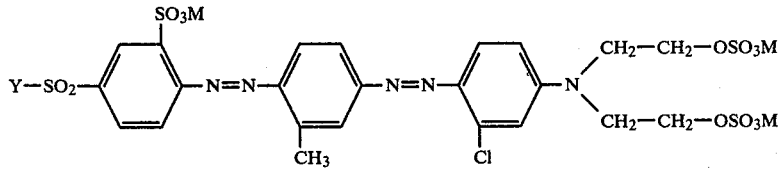

in which Y is vinyl or β-sulfatoethyl and M is hydrogen or an alkali metal.

* * * * *